United States Patent
Magistrado et al.

(10) Patent No.: US 9,529,783 B2
(45) Date of Patent: Dec. 27, 2016

(54) LIVE PREVIEWS FOR MULTITASKING AND STATE MANAGEMENT

(71) Applicant: Yahoo! Inc., Sunnyvale, CA (US)

(72) Inventors: Vince Magistrado, Sunnyvale, CA (US); Utkarsh Srivastava, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 312 days.

(21) Appl. No.: 14/176,486

(22) Filed: Feb. 10, 2014

(65) Prior Publication Data

US 2015/0149951 A1    May 28, 2015

Related U.S. Application Data

(60) Provisional application No. 61/909,235, filed on Nov. 26, 2013.

(51) Int. Cl.
  *G06F 3/048* (2013.01)
  *G06F 17/22* (2006.01)
  *G06F 3/0482* (2013.01)
  *G06F 3/0484* (2013.01)

(52) U.S. Cl.
  CPC ......... *G06F 17/2247* (2013.01); *G06F 3/0482* (2013.01); *G06F 3/04842* (2013.01)

(58) Field of Classification Search
  CPC . G06F 3/0482; G06F 3/04822; G06F 17/2247
  See application file for complete search history.

(56) References Cited

U.S. PATENT DOCUMENTS

| | | | | |
|---|---|---|---|---|
| 7,346,855 B2* | 3/2008 | Hellyar | ............... | G06F 3/0235 |
| | | | | 715/780 |
| 8,619,116 B2* | 12/2013 | Pennington | ............ | H04N 7/148 |
| | | | | 348/14.03 |
| 2001/0048448 A1 | 12/2001 | Raiz | | |
| 2002/0163545 A1* | 11/2002 | Hii | ................. | G06F 3/0483 |
| | | | | 715/838 |
| 2005/0278625 A1 | 12/2005 | Wessling et al. | | |

(Continued)

OTHER PUBLICATIONS

U.S. Appl. No. 14/179,803, filed Feb. 5, 2014, Office Action, Sep. 10, 2015.

(Continued)

*Primary Examiner* — Dino Kujundzic
(74) *Attorney, Agent, or Firm* — Hickman Palermo Becker Bingham LLP (57) ABSTRACT

Invoked states of one or more activities invoked in a web application is detected. The web application is configured to display, in a foreground, a current activity on a client device. On the client device, display of a multitask preview interface that includes one or more live previews is caused. Each live preview of the one or more live previews corresponds to an invoked state of an activity of the one or more activities. The one or more live previews includes a particular live preview that corresponds to a particular invoked state of a particular activity of the one or more activities. Selection of the particular live preview is detected. In response to detecting selection of the particular live preview, the current activity displayed in the foreground of the web application is switched to the particular state of the particular activity.

21 Claims, 8 Drawing Sheets

(56) References Cited

U.S. PATENT DOCUMENTS

| | | | |
|---|---|---|---|
| 2006/0277167 A1* | 12/2006 | Gross | G06F 17/30905 |
| 2007/0011258 A1* | 1/2007 | Khoo | G06F 3/0482 |
| | | | 709/206 |
| 2007/0038718 A1* | 2/2007 | Khoo | G06Q 10/107 |
| | | | 709/206 |
| 2008/0182628 A1 | 7/2008 | Lee | |
| 2008/0189628 A1 | 8/2008 | Liesche | |
| 2008/0238929 A1 | 10/2008 | Abdo | |
| 2008/0282196 A1* | 11/2008 | Park | H04M 1/72544 |
| | | | 715/838 |
| 2009/0259936 A1* | 10/2009 | Tanskanen | G06F 17/30905 |
| | | | 715/700 |
| 2009/0300511 A1* | 12/2009 | Behar | G06F 1/162 |
| | | | 715/745 |
| 2010/0083170 A1 | 4/2010 | Lim et al. | |
| 2010/0088628 A1* | 4/2010 | Flygh | G06F 3/0481 |
| | | | 715/779 |
| 2011/0016194 A1 | 1/2011 | Von Haden | |
| 2011/0138313 A1* | 6/2011 | Decker | G06F 3/0481 |
| | | | 715/777 |
| 2012/0331393 A1 | 12/2012 | Danninger | |
| 2014/0258101 A1 | 9/2014 | Svendsen | |
| 2014/0279022 A1* | 9/2014 | Commagere | G06Q 30/0277 |
| | | | 705/14.64 |
| 2015/0082214 A1 | 3/2015 | Roessler | |
| 2015/0149891 A1 | 5/2015 | Magistrado et al. | |

OTHER PUBLICATIONS

U.S. Appl. No. 14/173,803, filed Feb. 5, 2014, Notice of Allowance, Jan. 20, 2016.

* cited by examiner

FIG. 7

LIVE PREVIEWS FOR MULTITASKING AND STATE MANAGEMENT

CROSS-REFERENCE TO RELATED APPLICATIONS; PRIORITY CLAIM

This application claims benefit of Provisional Appln. 61/909,235, filed Nov. 26, 2013, the entire contents of which is hereby incorporated by reference as if fully set forth herein, under 35 U.S.C. §119(e).

FIELD OF THE INVENTION

The present invention relates to web applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web applications that support multiple activities traditionally use common user interface controls such as tabs or lists to show active and background activities. Typically, a user must manage the active and background activities, such as by interacting with the user interface to open a new tab, close a tab, navigate between tabs, and other actions. While these types of user interface controls achieve their purpose, they often result in cluttered user interfaces or confusing interaction patterns.

Furthermore, limited information is presented for a background activity, such as an activity opened in a tab in the background. Often, no visual or graphical information is provided. For example, a portion of a title or other text string is typically displayed in a limited region. Even if a visual icon representing the background activity is provided, the icon does not accurately reflect a current state of the specific background activity.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Live previews are provided for a web application. A live preview is a preview that reflects a current state of an activity invoked in the web application. According to one embodiment, the live previews generated by the techniques described herein are not simply captured images, but real time visual representations that reflect the current state of the associated activities. Live previews may be generated for activities that appear hidden from a user's perspective. For example, in a single-page web application configured to display a current activity in the foreground, a live preview may be generated for an activity other than the current activity, even if the other activity is not displayed in any other display area of the web application.

In one embodiment, techniques are provided for generating live previews for multitasking web applications. Multitasking web application typically includes a foreground configured to display a current activity on a client device. To generate a live preview for a multitasking web application, at least one "invoked state" is detected. An invoked state refers to the state of at least one activity invoked in a web application. On the client device, a multitask preview interface is displayed. The multitask preview interface includes at least one live preview. Typically, the multitask preview interface includes multiple live previews. Each live preview corresponds to a current state of an invoked state. In response to selection of a live preview, the current activity displayed in the foreground of the web application is switched to the activity corresponding to the selected live preview.

Multitask Preview Interface

Figure 1:
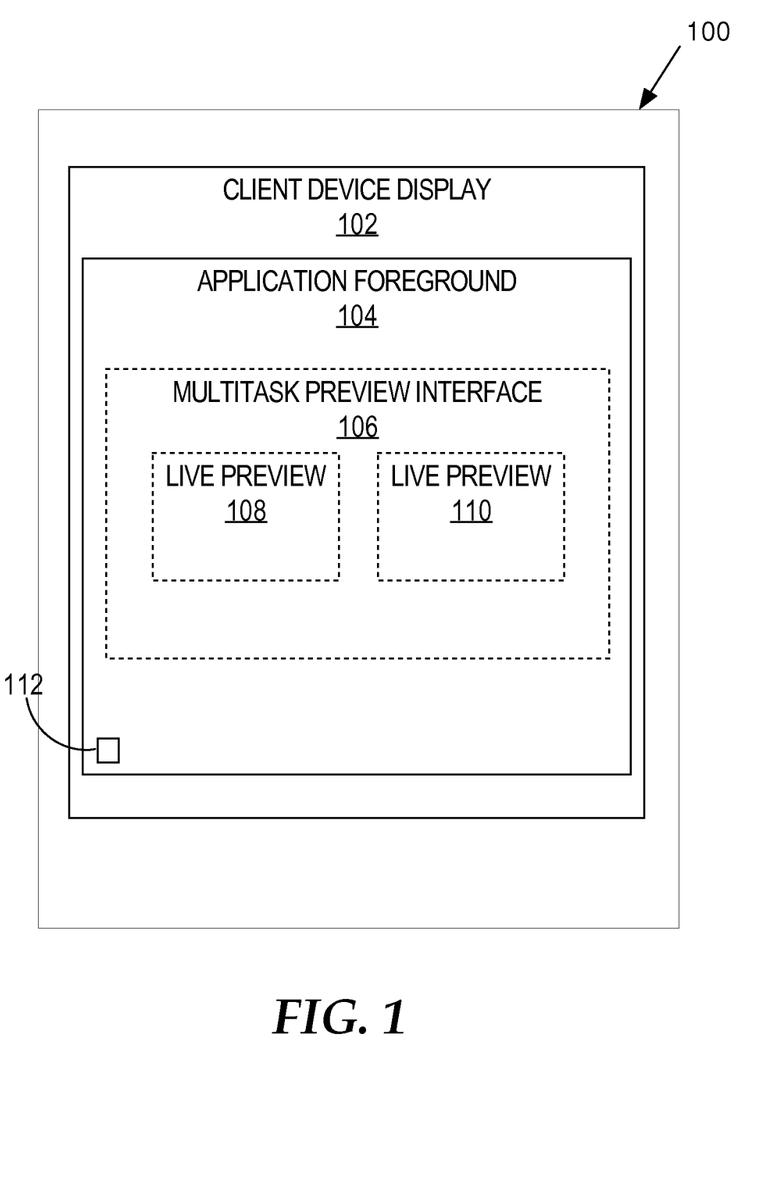
FIG. 1 illustrates an embodiment of a multitask preview interface on a client device display.

FIG. 1 illustrates of a multitask preview interface on a client device display, according to one embodiment. Client device 100 is configured to access a web application. Client device 100 includes client device display 102. Client device display 102 is configured to display the application foreground 104 of the web application. In FIG. 1, application foreground 104 is shown as a single block, but may be composed of multiple elements, as shown in FIG. 4.

As used herein, the term "web application" refers to any application that is coded in a browser-supported programming language, including but not limited to JavaScript. The web application may be a rich Internet application. A web application may be delivered to a browser over a private network or a public network (e.g. the World Wide Web), and may include browser-supported markup language that may be rendered in a browser, including but not limited to HyperText Markup Language (HTML).

As used herein, the term "browser" refers to any software application capable of retrieving resources over a network, such as the World Wide Web, and presenting the resources in a browser-like display area. The term includes but is not limited to standard browsers, such as Chrome, Firefox, and Internet Explorer. A browser may be a mobile app that includes a browser-like display area, wherein the mobile app is configured to run on a mobile device operating system. The web application may run in a browser, including applications comprising a browser-like display area.

Application foreground 104 is configured to display a current activity of the web application on client device display 102. In one embodiment, the web application is a single-page application having no background display area to display any activity other than the current activity. The web application may be implemented to support a plurality of activity types, which shall be described in greater detail hereafter.

The web application is configured to implement multitask preview interface 106. The web application may be configured, for example, to display multitask preview interface 106 in response to a multitask request being triggered. A user of the web application may trigger a multitask request, such as by using a keyboard shortcut or by interacting with an element of the web application. For example, a multitask request may be triggered based on input from a user input device such as a keyboard, a mouse, a touch screen, a voice command, or any other user input device.

The web application is configured to detect at least one invoked state. An invoked state is the state of an activity invoked in the web application. Examples of activities include viewing a document and/or group of documents, composing a document, performing a search, or other activities enabled in the web application. A document may include an email, a Short Message Service (SMS) message, a Multimedia Messaging Service (MMS) message, a social media post, any other message, a calendar event, a file, an image, a video, any other graphical and/or text-based document, or any other document that the web application is enabled to handle. A group of documents may be a folder, documents associated with a thread, documents associated with a tag, documents associated with a user, document associated with the group of users, or any other grouping of documents. An activity may be specific to a specific document and/or group of documents. For example, viewing a first document may be considered a separate activity from viewing a second document, and viewing an Inbox of an email account may be considered a separate activity from viewing another folder of the same email account.

In one embodiment, one or more specific types of activity are automatically detected as invoked states when the activities are invoked in the web application during a current session. For example, an invoked state may be detected each time viewing, composing or searching is performed. In one embodiment, detected invoked states are maintained in an HTML Document Object Model (DOM) tree associated with the web application, which shall be described in greater detail hereafter.

Multitask preview interface 106 includes at least one live preview 108-110. A live preview is a visual representation of a current state of an invoked state. For example, live previews 108-110 may each be a scaled-down visual representation of the current state of the associated activity, such as a thumbnail. Additionally, the scaled-down visual representation may be any visualization, such as a video, a 3-dimensional rendering, or any other visual representation.

In one embodiment, while multitask preview interface 106 is displayed, live previews 108-110 are updated in real time, thereby displaying a changing current state of the associated activity. In one embodiment, displaying the current state of an invoked state in real time refers to simulating display of the associated activity as if the associated activity were running in the foreground. In one embodiment, a browser-enabled programming language and/or one or more stylesheets are used to generate multitask preview interface 106. As used herein, the term "stylesheet" refers to any style information that may be applied to the content of a web document, where the style information is separated from the content of the web document. For example, JavaScript and one or more Cascading Style Sheet (CSS) stylesheets may be applied to generate multitask preview interface 106.

Hidden Invoked States

In one embodiment, the web application is single-page application having no background display area to display an activity other than the current activity, e.g. the activity displayed in application foreground 104. At least one of live previews 108-110 may correspond to a hidden invoked state associated with a previously invoked activity in the web application.

Interacting with the Multitask Preview Interface

A user may select a live preview from live previews 108-110 by interacting with multitask preview interface 106. For example, a live preview may be selected using one or more keyboard inputs, touchscreen inputs, mass inputs, and/or input from any other user input device. When a live preview is selected from multitask preview interface 106, application foreground 104 is switched to an activity corresponding to the selected live preview.

Additional interactions with live previews 108-110 may be implemented. For example, a specific input, such as mousing over a specific live preview, may cause zooming in and displaying of a larger version of the specific live preview in multitask preview interface 106. In one embodiment, multitask preview interface 106 includes at least one element for removing one or more unwanted live previews. For example, multitask preview interface 106 may include user interface controls for removing at least one unwanted live preview from the multitask preview interface. When an unwanted live preview is selected, the corresponding invoked state is removed from the at least one invoked states. In one embodiment, removing an unwanted live preview causes manipulation of the HTML DOM tree to remove one or more objects corresponding to invoked states associated with the unwanted live preview.

Multitask Preview Interface Examples

FIG. 2A-2D illustrate embodiments of a multitask preview interface on a client device display. Multitask preview interface 106 may be displayed as an opaque, semi-transparent, or completely transparent interface with respect to one or more other visual elements of the web application. Multitask preview interface 106 may or may not have a distinct boundary. Furthermore, the live previews 108-110 of multitask preview interface 106 may be opaque, semi-transparent, or completely transparent.

Figures 2A, 2B:
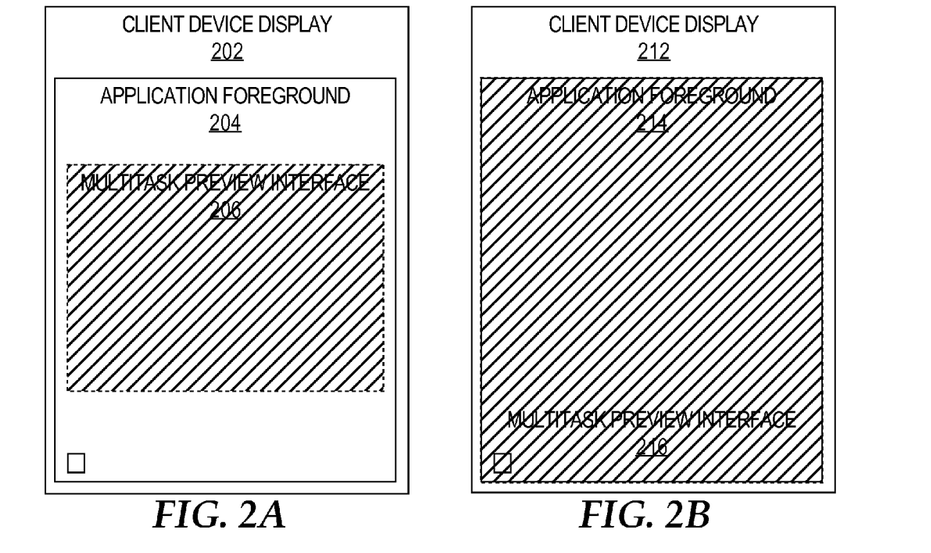
FIG. 2A-2D illustrate embodiments of a multitask preview interface on a client device display.
Figures 2C, 2D:
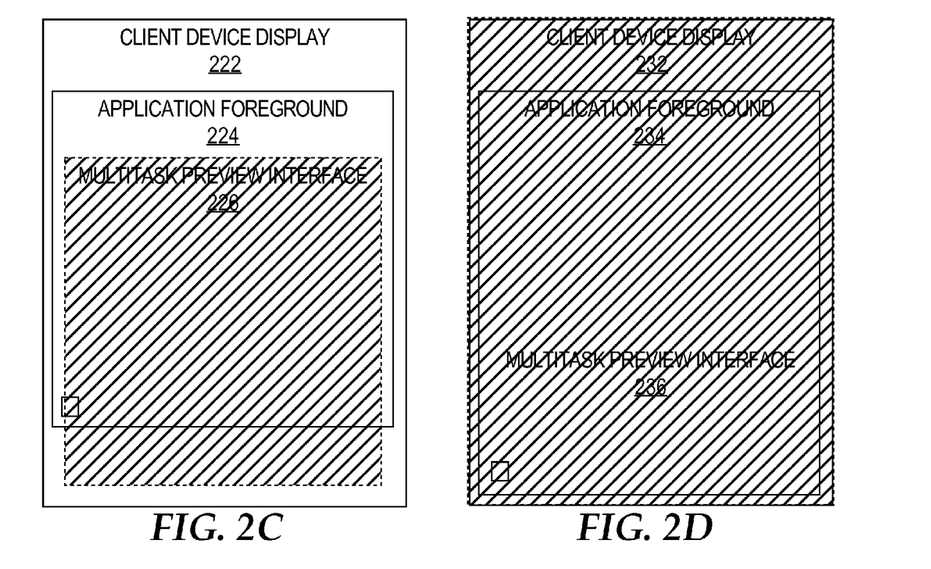

For example: in FIG. 2A, multitask preview interface 206 is displayed inside application foreground 204 on client device display 202; in FIG. 2B, multitask preview interface 216 is displayed within the boundaries of application foreground 204 on client device display 212; in FIG. 2C, multitask preview interface 226 is displayed to overlap the boundaries of application foreground 224 on client device display 222; and in FIG. 2D, multitask preview interface 236 is displayed full-screen on client device display 232, regardless of the boundaries of application foreground 234.

Invoked States

When an activity is invoked in a web application, an invoked state may be detected. In one embodiment, the invoked state is maintained in the HTML DOM tree corresponding to the web application, even if a foreground activity is switched in a single-page application such that the invoked state appears hidden from a user of the client device.

Figure 3A:
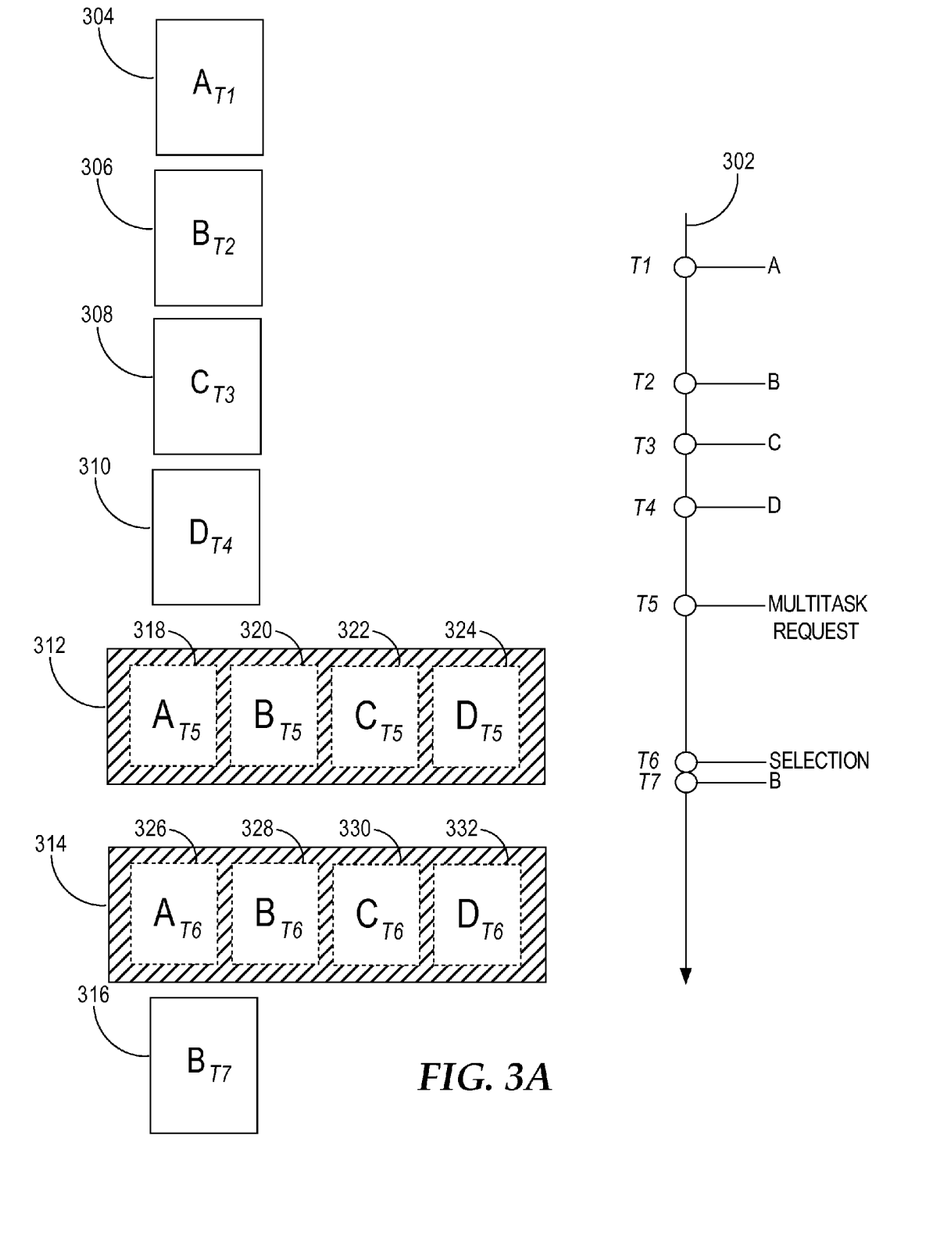
FIG. 3A illustrates embodiments of displayed elements in relation to activities invoked in the web application over time.

FIG. 3A illustrates embodiments of displayed elements in relation to activities invoked in the web application over time. Timeline 302 represents actions invoked in a web application over time.

At T1, activity A is invoked. Activity A corresponds to an invoked state A, which is displayed in foreground element 304 of the web application at T1. At T2, activity B is invoked. Activity B corresponds to an invoked state B, which is displayed in foreground element 306 of the web application at T2. At T3, activity C is invoked. Activity C corresponds to an invoked state C, which is displayed in foreground element 308 of the web application at T3. At T4, activity D is invoked. Activity D corresponds to an invoked state D, which is displayed in foreground element 310 of the web application at T4.

At T5, a multitask request is triggered in the web application. When the multitask request is detected, a multitask preview interface 312 is generated and displayed. Multitask preview interface 312 includes live previews 318-324. Live preview 318 is a visual representation of invoked state A at the current time, T5. Likewise, live previews 320-324 are visual representations of invoked states B, C and D, respectively, at T5. In one embodiment, live previews 320-324 are currently updated to reflect invoked states A-D in real time. For example, when the time is T6, the multitask preview interface appears as shown in multitask preview interface 314. Live previews 326-332 are visual representations of invoked states A, B, C and D, respectively, at T6.

At T6, live preview 328, which corresponds to invoked state B, is selected. Invoked state B corresponds to activity B. In response to the selection of live preview 328, invoked state B is displayed in the foreground element of the web application. At T7, the foreground element of the web application is switched based on the selected live preview. Element 316 represents the foreground element of the web application at T7, which contains invoked state B as of T7.

HTML DOM Tree

Figure 3B:
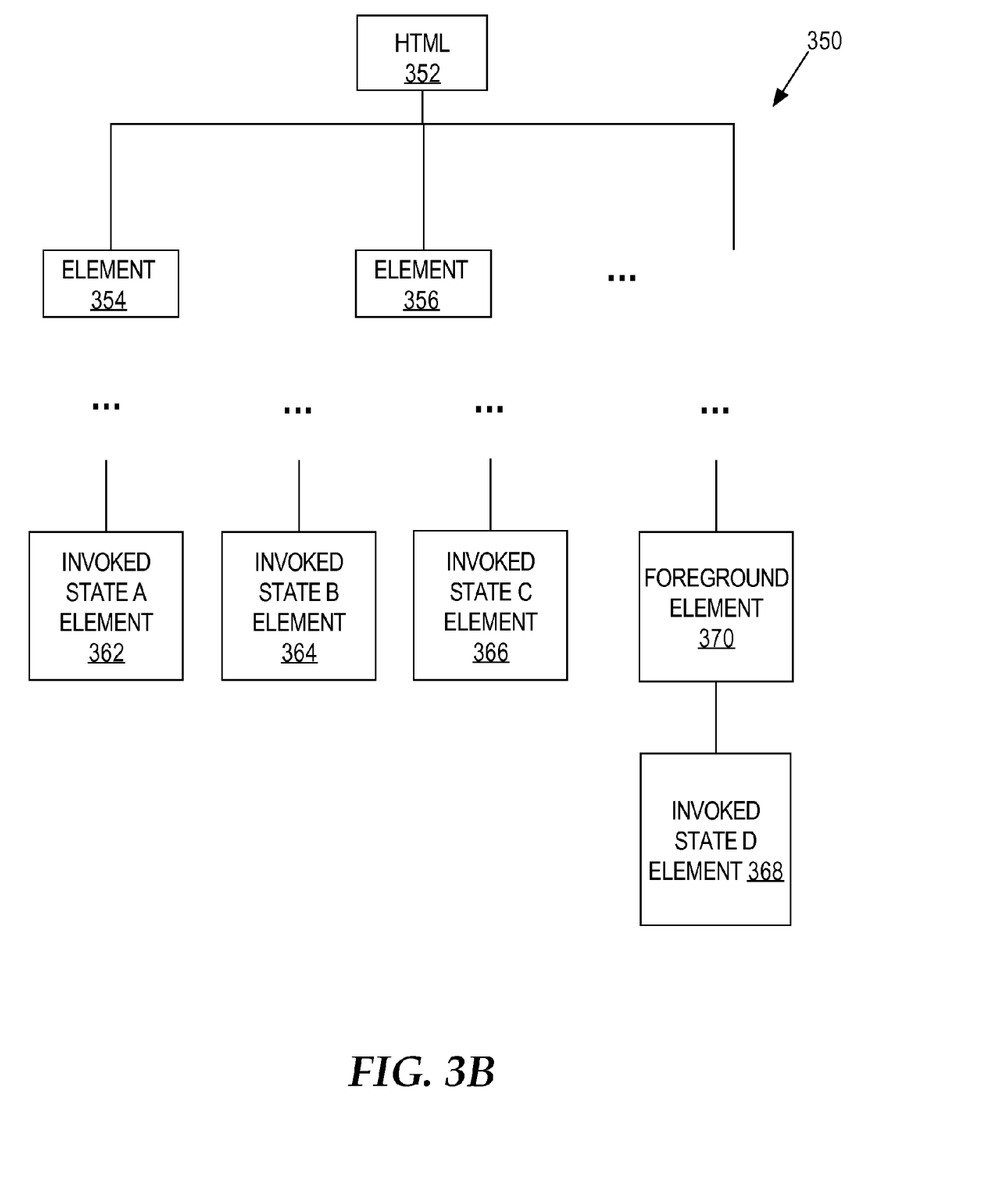
FIG. 3B illustrates an embodiment of a HyperText Markup Language (HTML) Document Object Model (DOM) tree.

FIG. 3B illustrates an embodiment of an HTML Document Object Model (DOM) tree. HTML DOM tree 350 includes a plurality of nodes 352-368. HTML DOM tree 350 is used by a browser to render elements of the web application on the client device. JavaScript, or any other browser-enabled programming language, may be used to manipulate the HTML DOM tree 350 corresponding to the web application.

In one embodiment, the web application is a single-page application with a foreground display area and no background display area to display an activity other than the current activity. Although multiple invoked states may be detected, only one current activity is displayed on the client device. For example, at T4 of FIG. 3A, invoked state D is associated with a current activity that is displayed in application foreground 310. At T4, invoked states A, B and C have also been detected, but are not displayed in application foreground 310. However, invoked states A, B and C are still represented in the HTML DOM tree 350 as invoked state A element 362, invoked state B element 364, and invoked state C element 366, respectively. At T4, invoked state D element 368, corresponding to the current activity at T4, is a child of foreground element 370 of HTML DOM tree 350 of the web application. Although invoked state A element 362, invoked state B element 364, and invoked state C element 366 may not be displayed in the web application, their presence in HTML DOM tree 350 allows for their usage in the generation of live previews. Additional details regarding handling the HTML DOM tree to provide live previews are provided hereafter.

Multitask Preview Interface Display Variations

Figure 4A:
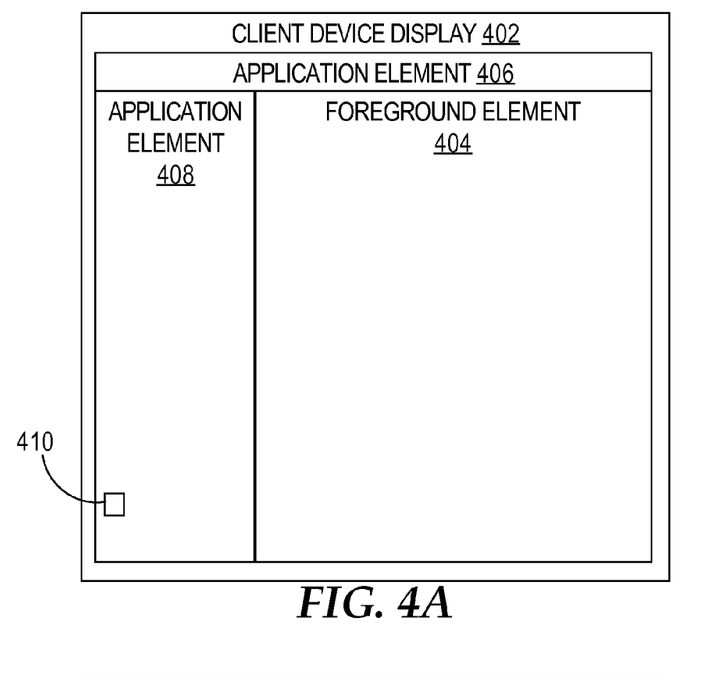
FIG. 4A illustrates an embodiment of elements displayed in a web application.

In FIG. 1, application foreground 104 is shown as a single block. FIG. 4A illustrates an embodiment in which multiple application elements 404-410 of the web application are displayed on client device display 402. Foreground element 404 is configured to display a current activity invoked in the web application. In one embodiment, other application elements 406-410 may also be considered elements in application foreground 104 of the web application that are not dependent on the current activity; when a new activity is invoked in the web application, application elements 406-410 do not change. For example, application elements 406-410 may include header elements, title elements, menu elements, navigation elements, or other elements not dependent on the current activity. Application elements 406-410 may include multitask preview trigger element 410. A user of the web application may trigger a multitask request by interacting with an multitask preview trigger element 410.

Figure 4B:
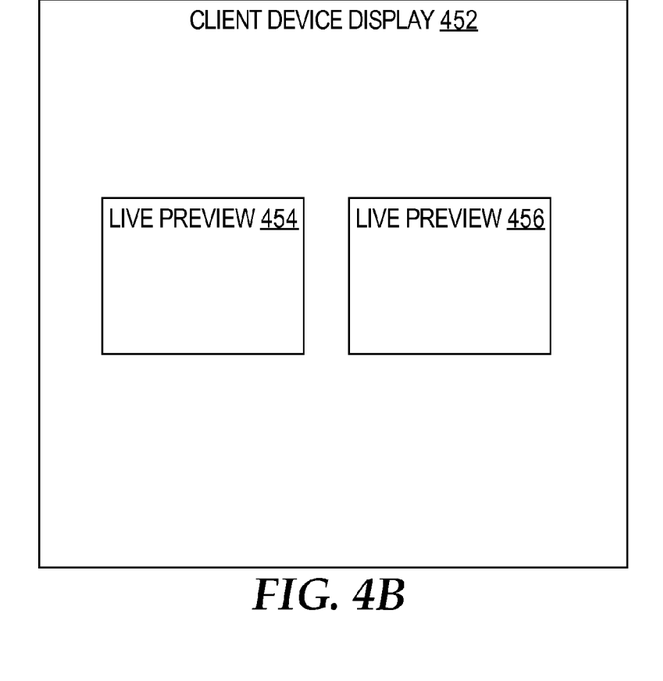
FIG. 4B illustrates an embodiment of a multitask preview interface displayed without one or more web application elements.

In FIGS. 2A-2D, various embodiments of a multitask preview interface are shown with respect to embodiments of an application foreground of the web application. FIG. 4B illustrates an embodiment of a multitask preview interface displayed without one or more web application foreground elements. In the embodiment shown, the multitask preview interface appears as a plurality of live previews 454-456 on client device display 452, and all other application elements are hidden from client device display 452. For example, live previews 454-456 may appear directly over a background wallpaper of the client device or the web application.

Grouping Live Previews

Figure 5A:
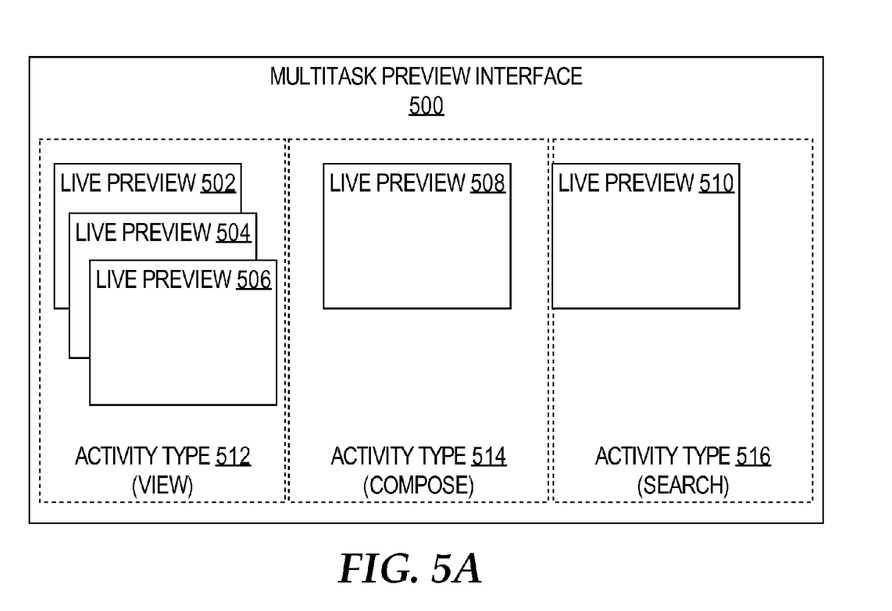
FIG. 5A illustrates an embodiment of a multitask preview interface with grouped live previews.

The live previews of a multitask preview interface may be grouped. FIG. 5A illustrates an embodiment of a multitask preview interface with grouped live previews. In multitask preview interface 500, live previews 502-510 are displayed in one or more groups. In one embodiment, the groups are based on activity type. In the embodiment shown, the activities types include viewing (activity type 512), composing (activity type 514), and searching (activity type 516). The group corresponding to activity type 512 includes live previews 502-506 for distinct activities of the same activity type 512. For example, live preview 502 may correspond to viewing a first document, live preview 504 may correspond to viewing a second document, and live preview 506 may correspond to viewing a third document.

Embedding Advertisements

Figure 5B:
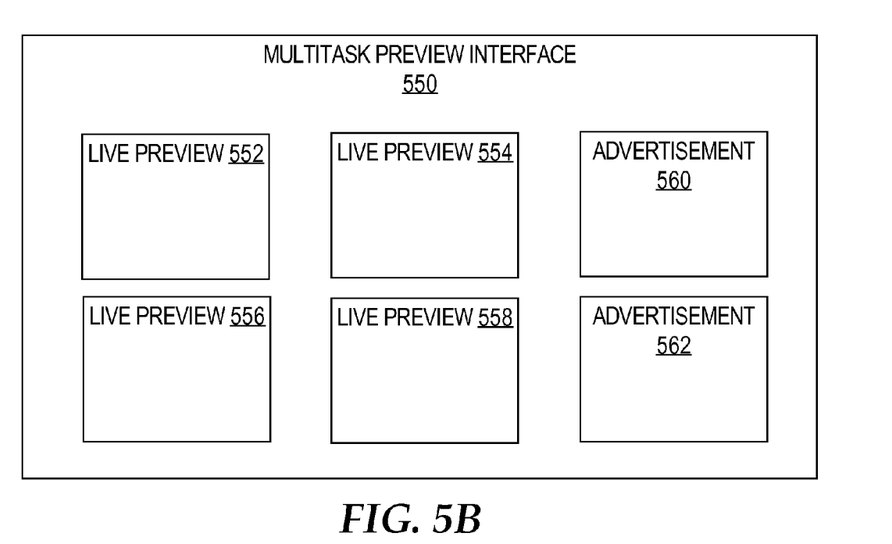
FIG. 5B illustrates an embodiment of a multitask preview interface with at least one advertisement.

According to one embodiment, one or more advertisements are displayed in a multitask preview interface. In one embodiment, at least one advertisement is obtained based on a current state of at least one activity corresponding one of the detected invoked states. The at least one advertisement is displayed in the multitask preview interface with the corresponding live previews. For example, one or more text advertisements may be displayed in the multitask preview interface. FIG. 5B illustrates an embodiment of a multitask preview interface with at least one advertisement. Multitask preview interface 500 includes live previews 552-558 and advertisements 560-562. One or more displayed advertisements may share one or more style elements of live previews 552-558. In one embodiment, the shared style elements are described in a CSS stylesheet that is applied to one or more objects in the HTML DOM tree corresponding to an activity to generate the live previews.

Multitask Preview Method

Figure 6:
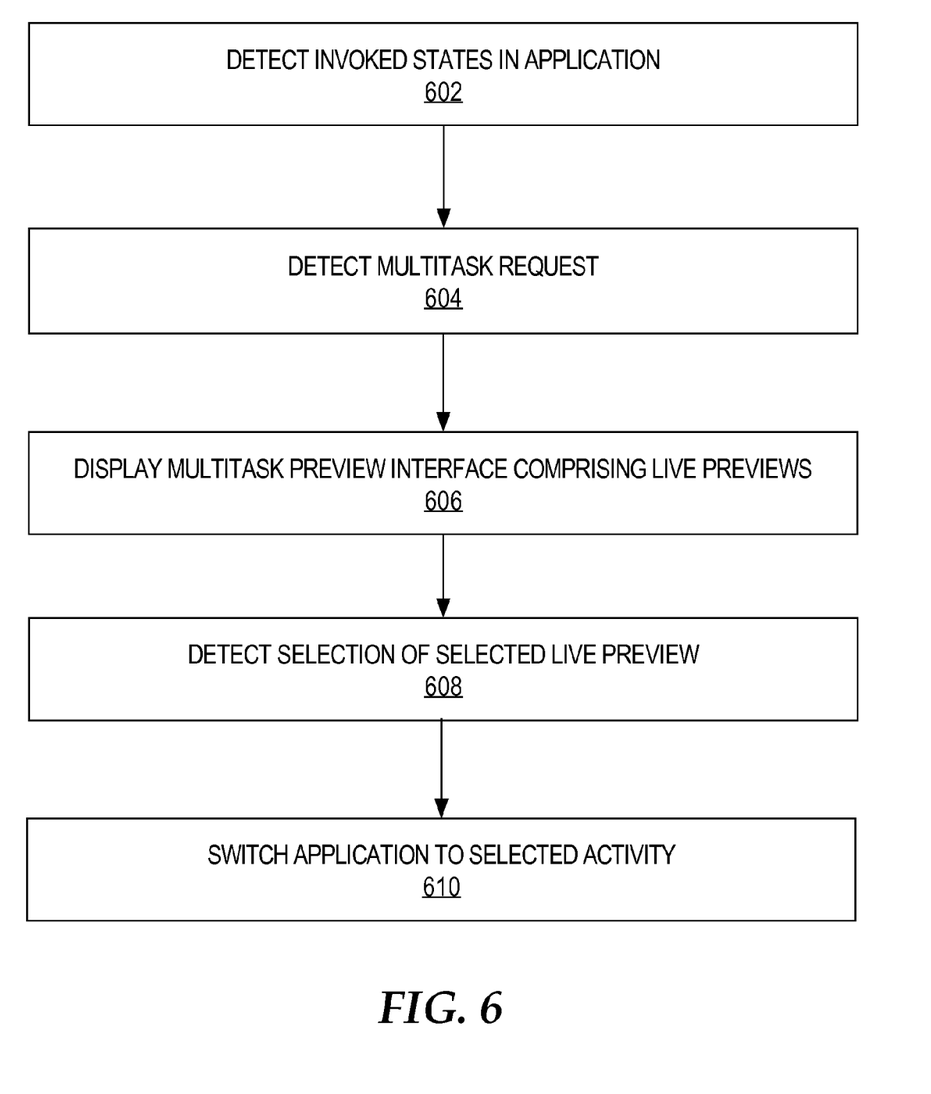
FIG. 6 is a flow diagram that illustrates an embodiment of a method for providing live previews for multitasking.

One embodiment is directed to a method for providing live previews for multitasking in a web application. FIG. 6 is a flow diagram that illustrates an embodiment of a method for providing live previews for multitasking between activities. At block 602, at least one invoked state is detected in a web application. Each invoked state corresponds to an activity invoked in a web application. In one embodiment, each invoked state corresponds to one or more objects in the HTML DOM tree that are associated with the activity invoked The web application includes a foreground configured to display a current activity on the client device. The foreground of the web application may not indicate the invoked state is present, such as in a single-page application having no background display area to display an activity other than the current activity. In one embodiment, the foreground of the web application lacks any link, tab, or shortcut directly to the invoked state. In this respect, one or more invoked states may be hidden invoked states.

Processing continues to block 604, where a multitask request is detected. A multitask request may be triggered by a user of the web application, such as by a keyboard shortcut or by interacting with an element of the web application, including but not limited to graphical elements. For example, a multitask request may be triggered based on input from a user input device such as a keyboard, a mouse, a touch screen, a voice command, or any other user input device.

Processing continues to block 606, where the method causes display, on the client device, of a multitask preview interface. The multitask preview interface comprises at least one live preview. Each live preview corresponds to a current state of one of the at least one invoked state. The multitask preview interface may be generated based on one or more objects in HTML DOM tree corresponding to the web application. For example, one or more stylesheets and/or browser-supported programming languages may be applied to the one or more objects. In one embodiment, JavaScript is applied to one or more objects of the HTML DOM tree. A CSS stylesheet may also be applied. For example, CSS and JavaScript may be used to scale and arrange HTML DOM tree information associated with the activities to generate the multitask preview interface with the live previews.

Processing continues to block 608, where selection of a selected live preview is detected. In one embodiment, the selected live preview is selected by a user using the multitask preview interface.

Processing continues to block 610, where, in response to selection of a selected live preview of the at least one live preview, the current activity displayed in the web application is switched to a selected activity corresponding to the selected live preview.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
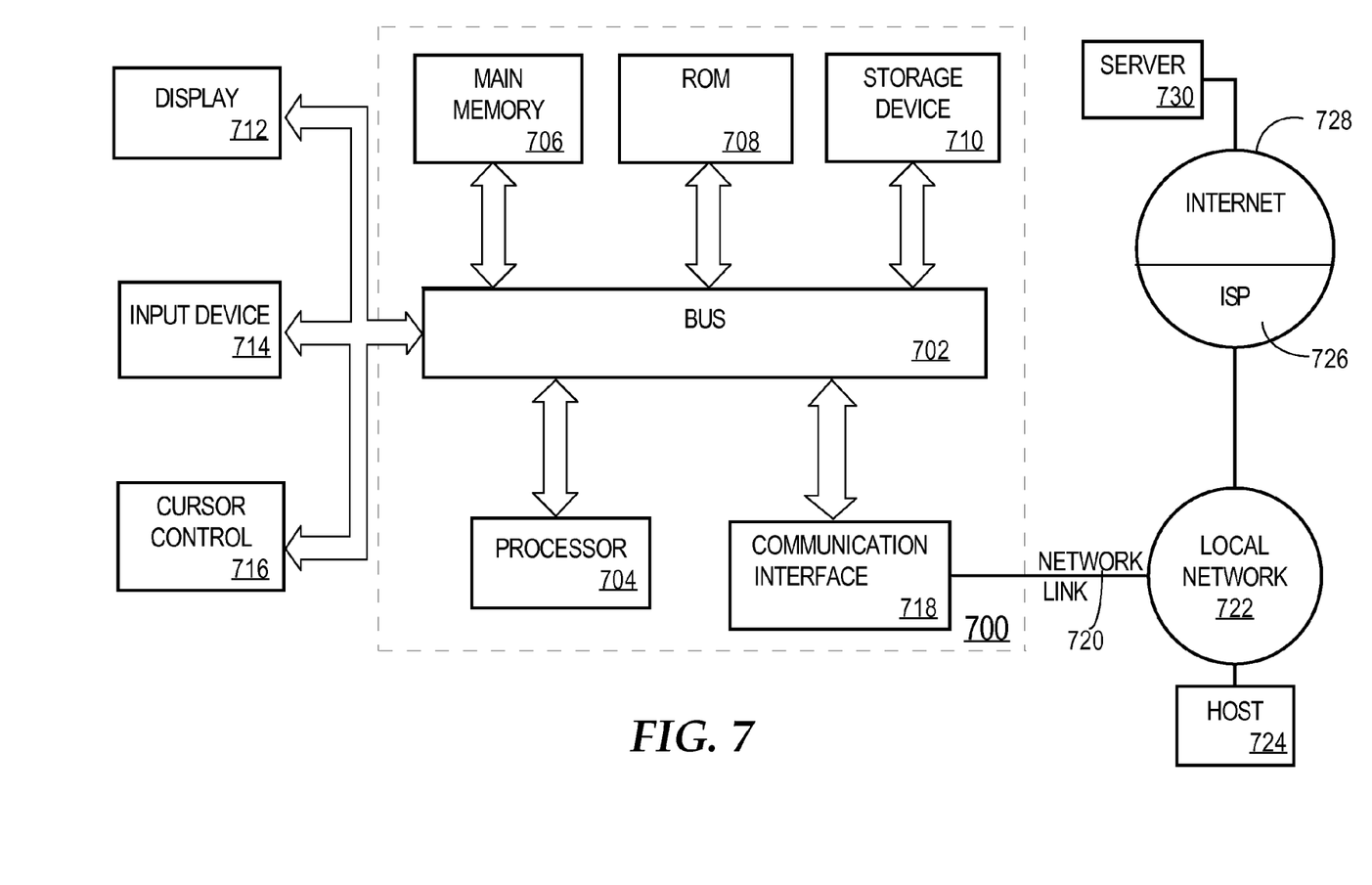
FIG. 7 illustrates a computer system upon which one or more embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting a plurality of activities, wherein each activity in the plurality of activities is an activity that has been invoked in a single web application;
   wherein, within the single web application, one activity of the, plurality of activities is designated a current activity and one or more other activities are designated as hidden activities;
   wherein the web application is configured to render, in a foreground display area of the web application, a current state of the current activity;
   wherein the web application does not render any state of any hidden activity;
   causing display of a multitask preview interface comprising a plurality of live previews;
   wherein each live preview of the plurality of live previews corresponds to a different activity of the plurality of activities of the single web application;
   wherein each live preview of the plurality of live previews displays a current state of the activity to which the live review corresponds;
   detecting selection of a particular live preview that corresponds to a particular activity of the plurality of activities; and
   in response to detecting selection of the particular live preview:
     designating the particular as the current activity;
     designating one or more of the activities other than the particular activity as hidden activities; and
     updating the foreground display area of the web application to render the current state of the particular activity;
   wherein the method is performed by one or more computing devices.

2. The method of claim 1, wherein objects corresponding to the plurality of activities, including the one or more hidden activities, are maintained in a Document Object Model (DOM) tree, the method further comprising updating a state of a hidden activity by updating an object in the DOM tree corresponding to the current state of the hidden activity.

3. The method of claim 2, wherein the plurality of live previews is generated by applying at least one of a client-side scripting language Cascading Style Sheets (CSS) to an object in the DOM tree corresponding to a current state of each of the plurality of activities.

4. The method of claim 2, wherein updating, the foreground display area of the web application comprises causing content to be displayed in the foreground display area based on one or more objects in the DOM tree corresponding to the current state of the particular activity.

5. The method of claim 1, wherein the web application does not have any secondary display area for displaying a state of any activity other than the activity designated as the current activity.

6. The method of claim 1, further comprising:
detecting invocation of a given activity of the web application during a current session;
responsive to detecting invocation of the given activity, if the given activity is a specific type of activity, then automatically adding the given activity to the plurality of activities.

7. The method of claim 6, wherein the specific type of activity is one of: composing a first specific document, viewing a second specific document, or searching a specific term.

8. The method of claim 6, wherein the plurality of live previews are displayed in one or more groups in the multitask preview interface based on activity type.

9. The method of claim 1, wherein the multitask preview interface comprises user interface controls for removing at least one unwanted live preview from the multitask preview interface.

10. The method of claim 1, further comprising:
obtaining at least one advertisement based on a current state of one of the one or more activities; and
displaying the at least one advertisement in the multitask preview interface with at least one corresponding live preview.

11. A non-transitory computer storage medium storing instructions which, when executed by one or more processors, cause performance of a method comprising:
detecting a plurality of activities, wherein each activity in the plurality of activities is an activity that has been invoked in a single web application;
wherein, within the single web application, one activity of the plurality of activities is designated a current activity and one or more other activities are designated as hidden activities;
wherein the web application is configured to render, in a foreground display area of the web application, a current state of the current activity;
wherein the web application does not render any state of any hidden activity;
causing display of a multitask preview interface comprising a plurality of live previews;
wherein each live preview of the plurality of live previews corresponds to a different activity of the plurality of activities of the single web application;
wherein each live preview of the plurality of live previews displays a current state of the activity to which the live preview corresponds;
detecting selection of a particular live preview that corresponds to a particular activity of the plurality of activities; and
in response to detecting selection of the particular live preview:
designating the particular activity as the current activity;
designating one or more of the activities other than the particular activity as hidden activities; and
updating the foreground display area of the web application to render the current state of the particular activity.

12. The non-transitory computer storage medium of claim 11, wherein objects corresponding to the plurality of activities, including the one or more hidden activities, are maintained in a Document Object Model (DOM) tree, the method further comprising updating a state of a hidden activity by updating an object in the DOM tree corresponding to the current state of the hidden activity.

13. The non-transitory computer storage medium of claim 12, wherein the plurality of live previews is generated by apply at least one of a client-side scripting language and Cascading Style Sheets (CSS) to an object in the DOM tree correspond to a current state of each of the plurality of activities.

14. The non-transitory computer storage medium of claim 12, wherein updating the foreground display area of the web application comprises content to be displayed in the foreground display area based on one more objects in the DOM tree corresponding to the current state of the particular activity.

15. The non-transitory computer storage medium of claim 11, wherein does not have any second display area for displaying a state of any activity other than the activity designated as the current activity.

16. The non-transitory computer storage medium of claim 11, the method further comprising:
detecting invocation of a given activity of the web application during a current session;
responsive to detecting invocation of the given activity, if the given activity is a specific type of activity, then automatically adding the given activity to the plurality of activities.

17. The non-transitory computer storage medium of claim 16, wherein the specific type of activity is one of: composing a first specific document, viewing a second specific document, or searching a specific term.

18. The non-transitory computer storage medium of claim 16, wherein the plurality of live previews are displayed in one or more groups in the multitask preview interface based on activity type.

19. The non-transitory computer storage medium of claim 11, wherein the multitask preview interface comprises user interface controls for removing at least one unwanted live preview from the multitask preview interface.

20. The non-transitory computer storage medium of claim 11, the method further comprising:
obtaining at least one advertisement based on a current state of one of the one or more activities; and
displaying the at least one advertisement in the multitask preview interface with at least one corresponding live preview.

21. A system comprising a processor and one or more stored sequences of instructions which, when executed by the processor, cause the processor to perform:
detecting a plurality of activities, wherein each activity in the plurality of activities is an activity that has been invoked in a single web application;
wherein, within the single web application, one activity of the plurality of activities is designated a current activity and one or more other activities are designated as hidden activities;
wherein the web application is configured to render, in a foreground display area of the web application, a current state of the current activity;
wherein the web application does not render any state of any hidden activity;
causing display of a multitask preview interface comprising a plurality of live previews;
wherein each live preview of the plurality of live previews corresponds to a different activity of the plurality of activities of the single web application;

wherein each live preview of the plurality of live preview displays a current state of the activity to which the live preview corresponds;

detecting selection of a particular live preview that corresponds to a particular activity of the plurality of activities; and in response to detecting selection of the particular live preview:
  designating the particular activity as the current activity;
  designating one or more of the activities other than the particular activity as hidden activities; and
  updating the foreground display area of the web application to render the current state of the particular activity.

* * * * *